United States Patent [19]

Lee: Maw-huei

[11] 3,710,032

[45] Jan. 9, 1973

[54] TELEPHONE SILENCING APPARATUS AND METHOD

[75] Inventor: Lee: Maw-huei, Atlanta, Ga.

[73] Assignee: B. J. Powell, Decatur, Ga. ; a part interest

[22] Filed: Feb. 3, 1971

[21] Appl. No.: 112,122

[52] U.S. Cl. ................................................179/84 L

[51] Int. Cl. ...............................................H04m 1/26

[58] Field of Search ............................179/84 R, 84 L

[56] References Cited

UNITED STATES PATENTS

| | | | |
|---|---|---|---|
| 2,073,585 | 3/1937 | Parissi | 179/84 L |
| 2,711,154 | 6/1955 | Fraziani | 179/84 R |
| 3,226,489 | 12/1965 | Grambsch | 179/84 R |
| 3,585,303 | 6/1971 | Chieffo | 179/84 L |

*Primary Examiner*—Kathleen H. Claffy
*Assistant Examiner*—William A. Helvestine
*Attorney*—B. J. Powell

[57] ABSTRACT

Method and apparatus for selectively silencing the bell of a telephone wherein the method comprises selectively reducing the resultant magnetomotive force through the ringer circuit to a value below that necessary to ring the bell. The method also includes selectively increasing the ringing voltage output from the central system generator with a transformer to increase the current level in the ringer circuit and thus the magnetomotive force above that necessary to ring the bell.

10 Claims, 4 Drawing Figures

INVENTOR
MAW-HUEI LEE
BY: BJ Powell
ATTORNEY

INVENTOR
MAW-HUEI LEE
BY: B J Powell
ATTORNEY

TELEPHONE SILENCING APPARATUS AND METHOD

One embodiment of the apparatus includes an impedance means selectively connectable between the incoming ringer hot wire and the ringer circuit of the telephone by a switch. The impedance means has an impedance valve sufficiently great to reduce the current flow through the ringer circuit and thus the magnetomotive force below that necessary to ring the bell when the standard ringing signal voltage is imposed thereon. This embodiment of the apparatus may also include a voltage step-up transformer selectively connecting the signal generator to the ringer circuit to increase the ringer voltage and the ringer current as well as the magnetomotive force to a value above that necessary to ring the bell.

Another embodiment of the apparatus includes switch means selectively connecting the incoming ringer hot wire with the ringer circuit in such a way as to reduce the resultant magnetomotive force generated in the ringer circuit to a value below that necessary to ring the bell. This may be accomplished by reversing the current flow in one of the two coils in the ringer circuit.

BACKGROUND OF THE INVENTION

Frequently telephone users desire to prevent the telephone from ringing in order to not be disturbed. In an attempt to solve this problem, users sometimes leave the handset out of its cradle so that the ringer circuit is disconnected and the main line circuitry is connected. After a short time in which no signals are transmitted over the main line circuitry, the central telephone circuitry imposes an audible signal over the line to disturb the user and indicate to the user that the handset is off the cradle. Moreover, when the handset is out of its cradle, an incoming caller receives a busy signal indicating that the telephone is in use. This causes the incoming caller to be encouraged to call back later, and, if he continues to receive a busy signal, to have the telephone verified by a telephone operator. When the operator finds that the handset is simply out of the cradle and not in use, a very loud audible signal will be caused to issue from the handset to have same returned to the cradle or sometimes a technician is sent to the user's address to check the telephone. Also, when the handset is out of its cradle, a constant power drain is imposed on the central telephone circuitry and if the telephone is on a party line, other telephone users on the line are illegally prevented from using their telephone.

Users also disconnect the bell in the telephone from the ringer circuit so that an open exists in the ringer circuit. This has been unsatisfactory due to the fact that the telephone must be disassembled each time it is desired to connect or disconnect the bell. Once the ringer circuit is disconnected, an incoming caller receives no ringing signal and thus thinks that the telephone is out of order. If he reports same to the telephone company, its open circuit check will indicate that the telephone is out of order and a technician will be sent to repair same.

Users may also completely disconnect the telephone from the main line circuitry. In addition to causing the same problems as expressed with a disconnected ringer circuit, the user may forget to re-connect the telephone in an emergency thereby preventing the user from making an outgoing call.

Some users may silence the bell by mechanically preventing the bell hammer from striking the bell. Using this technique requires that the telephone be disassembled each time the bell is silenced and also makes it difficult to indicate the status of the ringer circuit.

Thus, there has been no satisfactory inexpensive way to selectively prevent the telephone from ringing.

SUMMARY OF THE INVENTION

These and other problems associated with the prior art are overcome by the invention disclosed herein by providing a means by which the ringing circuit of the telephone can be silenced without interfering with the use of the telephone for outgoing telephone calls or the operation of the telephone in conjunction with the central telephone system. Means is also provided whereby the telephone ringing circuit can be made audible from the central telephone system to insure that the user can be reached in an emergency.

One embodiment of the apparatus of the invention includes an impedance and switch means for selectively connecting the impedance in series with the telephone ringer circuit. The value of the impedance is such that the current level and thus the magnetomotive force will be maintained below the level to cause the telephone bell to ring when the normal ringer voltage is imposed thereon.

A transformer may be used in the central telephone system to selectively connect the normal ringing signal generator with the ringer circuit of the telephone to step up the voltage supplied to the ringer circuit and cause the current level to rise above that required to ring the bell when the additional impedance is interposed in the ringer circuit.

Another embodiment of the invention includes switch means which selectively connects the incoming ringer hotwire to the ringer circuit in such a way as to reduce the resultant magnetomotive force below that level necessary to ring the bell. The bell is silenced when the current flow through one of the coils of the bell is reversed.

These and other features and advantages of the invention disclosed herein will become more fully understood upon consideration of the following detailed description and accompanying drawings wherein like characters of reference designate corresponding parts through the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
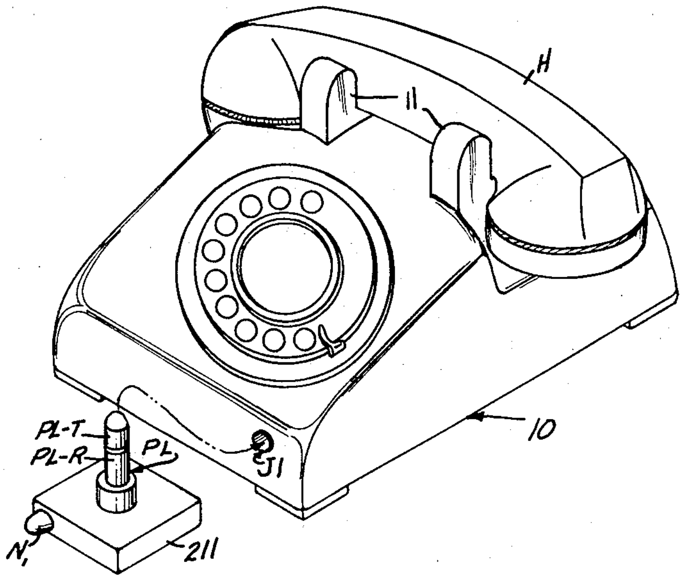
FIG. 1 is a perspective view showing one embodiment of the invention.
Figure 2:
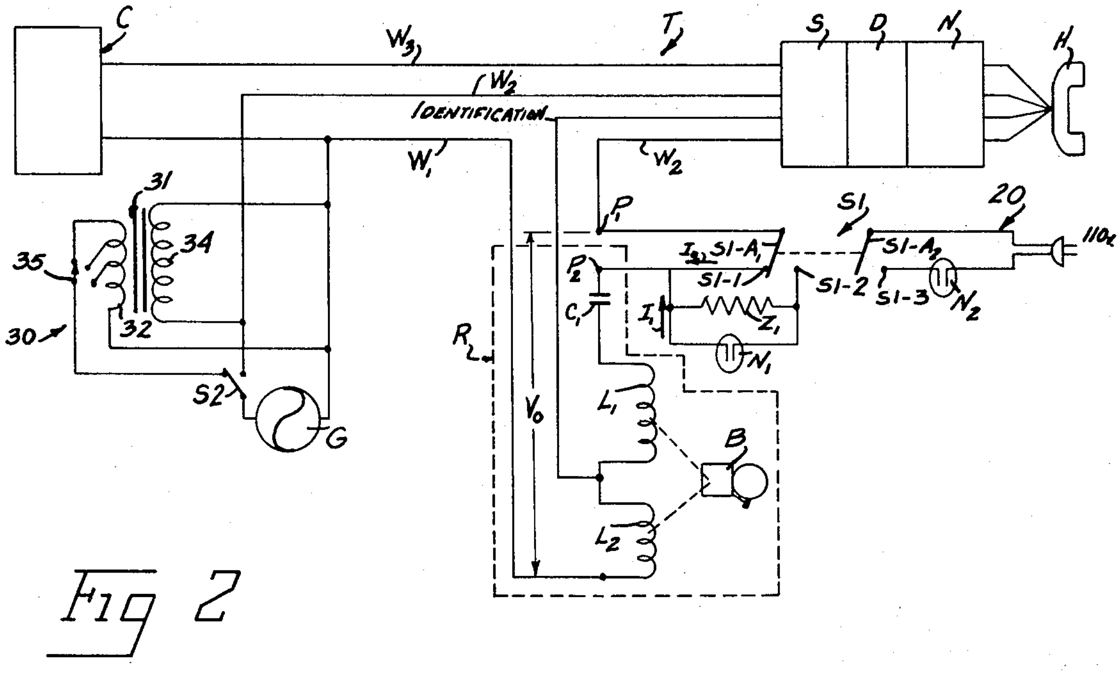
FIG. 2 is a schematic electrical diagram for one embodiment of the invention.

Referring to FIGS. 1 and 2, it will be seen that the first embodiment of the invention is used in conjunction with a standard telephone 10 and its associated circuit T. The standard telephone circuit has a ringer circuit R, a switchhook circuit S, a dial circuit D, a network circuit N and a handset H. Since the invention is connected to the ringer circuit R, only this circuit is shown in detail.

The telephone circuit T is connected to the central telephone system C in conventional manner with the ringing signal generator G of system C being selectively connectable to the ringer circuit R through the invention.

The ringer circuit R includes a pair of coils $L_1$ and $L_2$ used to drive bell B connected in series with each other and with a capacitor $C_1$. This circuit is connected to common ground wire $W_1$ on one side and is selectively connected to ringer hot wire $W_2$ from the generator G through the switchhook circuit S. Thus, when handset H is in its cradle 11 of telephone 10 as seen in FIG. 1, the ringer circuit R is connected to wires $W_1$ and $W_2$ so that generator G can selectively impose the standard ringing voltage $V_o$ across the ringer circuit R to create a ringing current $I_o$ in coils $L_1$ and $L_2$ thereby generating the necessary magnetomotive force to ring the bell B.

In the embodiment of the invention illustrated in FIG. 2, ringer hot wire $W_2$ is connected to the ringer circuit R through a silencing circuit 20 at points $P_1$ and $P_2$. Circuit 20 includes a switch S1 with its switch arm S1-$A_1$ connected to hot wire $W_2$. One of its contacts S1-1 is connected directly to the ringer circuit R and the other of its contacts S1-2 is connected to the ringer circuit R through impedance $Z_1$ and neon lamp $N_1$ in parallel with each other. Thus, when switch arm S1-$A_1$ is connected to contact S1-1, the ringer circuit R is connected directly to hot wire $W_2$, and when arm S1-$A_1$ is connected to contact S1-2, the ringer circuit R is connected to wire $W_2$ through impedance $Z_1$ and neon lamp $N_1$.

The combined impedance value of impedance $Z_1$ and lamp $N_1$ is sufficient to maintain the current $I_1$ through ringer circuit R less than the current $I_o$ through circuit R. This insures that the bell B will not ring since a current equal to or greater than current $I_o$ is necessary to generate a sufficient magnetomotive force to ring the bell B.

The neon lamp $N_1$ has a sufficiently low threshold voltage to be ignited when the voltage from the signal generator G is imposed on wire $W_2$ and is sufficiently low holding current to remain ignited as long as the voltage from the generator G is imposed on wire $W_2$. Thus, lamp $N_1$ will be lit when the bell B would normally ring but not when the generator G is not supplying a signal to the ringer circuit R. While various neon lamps $N_1$ may be used, it has been found that lamp model NE51 rated at 1/25 watt and manufactured by the General Electric Company is satisfactory.

If no visual ringing signal is required when the silencer circuit 20 is activated, then lamp $N_1$ can be eliminated. While various impedances $Z_1$ may be used as long as the ringer current $I_1$ is maintained below the current $I_o$, it has been found that a resistor of 18K ohms is satisfactory when lamp $N_1$ is used and a resistor of 10K ohms is satisfactory when lamp $N_1$ is eliminated.

If it is desired that a visual indication be provided when the circuit 20 is activated to silence the bell B of telephone 10, then another switch arm S1-$A_2$ may be provided which is ganged with arm S1-$A_1$ and connectable to one side of a standard 110 volt household circuit. The contact S1-3 associated with arm S1-$A_2$ is connected to the other side of the 110 volt household circuit through lamp $N_2$. Since arm S1-$A_2$ is connected to contact S1-3 only when arm S1-$A_1$ is connected to contact S1-2, lamp $N_2$ will indicate when the silencer circuit is activated.

In order for the bell on telephone 10 to still be rung from the central telephone system C even though circuit 20 is activated, an additional power circuit 30 may be selectively used to connect the ringing signal generator G to hot wire $W_2$ to increase the voltage supplied to the ringer circuit R sufficiently to cause a rise in current $I_1$ to a value above current $I_o$. This will cause the bell B to ring in case it is necessary to reach the telephone user for an emergency. Circuit 30 includes a switch S2 and a transformer 31. Switch S2 is effective to connect generator G directly to hot wire $W_2$ in one position and to connect generator G to the primary winding 32 of transformer 31 in its other position. The secondary winding 34 of transformer 31 is connected to hot wire $W_2$.

When generator G is connected directly to hot wire $W_2$, it supplies the standard voltage $V_o$ to ringer circuit R. When generator G is connected to the primary winding 32, the voltage is stepped up through secondary winding 34 to ringer circuit R. The amount of voltage from the secondary winding 34 is stepped up is sufficient to cause the current $I_1$ through circuit 20 and ringer circuit R to equal or exceed the value of current $I_o$ so that the bell B in telephone 10 will ring. Since the amount of voltage necessary to generate a sufficient current in circuit 20 may vary due to transmission losses, transformer 31 may have a mechanism 35 to vary the output voltage from secondary winding 34 and adjust the current flow through circuits 20 and R.

Figure 3:
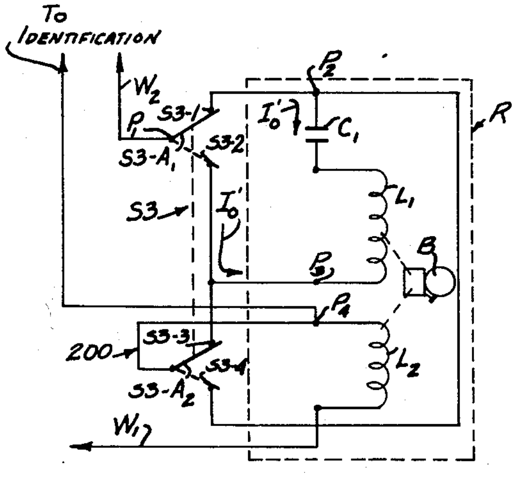
FIG. 3 is a partial schematic electrical diagram for another embodiment of the invention.

Referring now to FIG. 3, the second embodiment of the invention is shown. Since those portions of the telephone circuit T are standard as shown in FIG. 2 with the exception of ringer circuit R only ringer circuit R is shown in detail. In this embodiment, the circuit R is connected to hot wire $W_2$ through silencing circuit 200.

Circuit 200 is a switch S3 which selectively connects the circuit R to wire $W_2$ so that the magnetomotive force produced by one of the bell coils is opposed by the magnetomotive force produced by the other coil so that the resultant magnetomotive force is below that level necessary to ring the bell. Switch S3 is shown with two switch arms S3-$A_1$ and S3-$A_2$ ganged together. Arm S3-$A_1$ has a normally closed contact S3-1 and normally open contact S3-2 associated therewith, and arm S3-$A_2$ has normally open contact S3-4 and normally closed contact S3-3 associated therewith.

Arm S3-$A_1$ is connected to wire $W_2$ at point $P_1$ and contacts S3-1 and S3-4 are connected to one side of capacitor $C_1$ and coil $L_1$ in series at point $P_2$. Contacts S3-2 and S3-3 are connected to coil $L_1$ at point $P_3$ and arm S3-$A_2$ is connected to coil $L_2$ at point $P_4$ with the other side of coil $L_2$ connected to ground wire $W_2$.

When switch S3 is in its OFF position as shown in FIG. 3, current $I_o$ will flow through capacitor C1, coil $L_1$ and coil $L_2$ to ground wire $W_1$ as indicated. On the other hand, when switch S3 is in its ON position as indicated by dotted lines in FIG. 3, current $I_0'$ flows through coil $L_1$, capacitor $C_1$ and coil $L_2$ as indicated. Since the current flow through coil $L_1$ is reversed in the ON position but is not in coil $L_2$, the magnetomotive forces of the coils are opposed so that the resultant magnetomotive force of the coils is below the level necessary to ring bell B.

Figure 4:
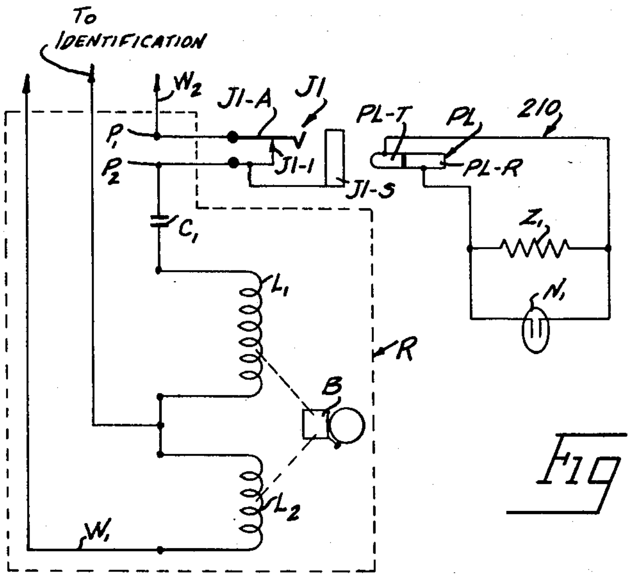
FIG. 4 is an electrical schematic diagram showing an alternate construction for the invention as illustrated in FIG. 2.

Referring now to FIG. 4 it will be seen that switch S1 in FIG. 2 has been replaced by a jack J1 and its associated plug PL in circuit 210. Jack J1 includes switch arm J1-A connected to point $P_1$ on wire $W_2$, and sleeve J1-S and normally closed contact J1-1 connected to point $P_2$ on ringer circuit R. Tip PL-T of plug PL is connected to ring PL-R through impedance $Z_1$ and neon lamp $N_1$ in parallel to each other.

When the plug PL is not in jack J1, contact J1-1 connects point $P_1$ with point $P_2$ and the ringer circuit operates in conventional manner. When plug PL is inserted in jack J1, contact J1-1 is opened while tip PL-T connects arm J1-A to ring PL-R and sleeve J1-S through impedance $Z_1$ and lamp $N_1$. This causes the bell to be silenced in the same manner as described for FIG. 2. Lamp $N_2$ can be eliminated since the housing 211 in FIG. 1 attached to plug PL can be color coded to indicate when the silencing circuit 210 is activated.

From the foregoing, it is to be understood that a jack and plug may be substituted for switches S1 and S3 without altering the operation of the invention.

OPERATION

In operation of the first embodiment of the invention, the telephone 10 is used in conventional manner when switch S1 is in its OFF position with contact S1-1 closed to connect circuit R directly to hot wire $W_2$ and contacts S1-2 and S1-3 are open. When the handset H is raised, the telephone 10 is connected to the main line wire $W_3$ and an outgoing call can be made in conventional manner.

When it is desired to silence the bell B, the user simply transfers switch S1 to its ON position so that contacts S1-2 and S1-3 are closed and contact S1-1 is open. Ringer circuit R is now connected to wire $W_2$ through impedance $Z_1$ and lamp $N_1$ so that when generator G supplies voltage $V_0$ to circuit R, the bell B will be silent. Lamp $N_2$ will be illuminated to indicate that the silencing circuit 20 is activated.

Since the current $I_1$ when circuit 20 is activated is less than the normal current $I_0$ through ringer circuit R, less power is required to operate the ringing signal generator G. Moreover, since the silencing circuit 20 is interposed between the ringer circuit R and hot wire $W_2$, the identification arrangement using coils $L_1$ and $L_2$ is not disturbed. If the normal test for an open circuit is made through the central telephone system C, the additional of circuit 20 will have virtually no effect on this test.

With switch S1 in its ON position, lamp $N_1$ will be illuminated when signal generator G imposes voltage $V_0$ on wire $W_2$ in conventional manner to visually indicate that an incoming call is being received. When the user removes the handset H from cradle 11, the handset H is connected to the main line wire $W_3$ in conventional manner so that the incoming call can be received. If the user desires to make an outgoing call, he simply removes the handset H from cradle 11. This connects the handset to wire $W_3$ and the dial circuit D to wires $W_2$ and $W_3$ in conventional manner so that the number for the outgoing call can be dialed and the call made. Thus, circuit 20 serves only to silence bell B and does not affect the other telephone functions.

If it is desirable that the bell B be rung as in the case of an emergency, the operator is contacted. The operator then causes switch S2 to be activated to place transformer 31 in the signal generating circuit. The mechanism 35 may be used to increase the signal voltage until the signal current $I_1$ equals or exceeds the value of current $I_0$. This causes coils $L_1$ and $L_2$ to ring the bell B to contact the user.

In the operation of the second embodiment of the invention shown in FIG. 3, the telephone user can use the telephone in conventional manner when the switch S3 is in the OFF position. To silence the bell, the switch S3 is transferred to the ON position to reverse the current flow in coil $L_1$. Thus, when a ringing signal is imposed on wire $W_2$, the resultant magnetomotive force will be reduced below the level necessary to ring the bell. It must be pointed out that an increase in the voltage of the ringing signal will not cause a sufficient magnetomotive force to ring the bell.

In that embodiment of the invention shown in FIG. 4, the operation is virtually the same as that shown in FIG. 2. When plug PL is out of jack J1, the telephone is used in conventional manner. When plug PL is inserted in jack J1, the bell is silenced in the same manner as described in FIG. 2. Transformer 31 may be used as described for FIG. 2 to ring the bell in an emergency.

While specific embodiments of the invention have been disclosed herein, full use of modifications, substitutions and equivalents may be made without departing from the scope of the inventive concept.

I claim:

1. Apparatus for silencing the bell of a telephone having a ringer circuit including coil means and a capacitor means in series and connected to the incoming ringer hot wire of a central telephone system, said apparatus including first means for selectively reducing the resultant magnetomotive force imposed on said bell by said coil means in the ringer circuit of said telephone below that necessary to ring said bell while permitting current to flow through said coil means when the standard ringing voltage is imposed on said incoming ringer hot wire to said telephone.

2. The apparatus of claim 1 wherein said means is interposed in series with the ringer circuit of said first telephone.

3. The apparatus of claim 2 wherein said first means includes switch means and impedance means, said switch means alternatively connecting said ringer circuit directly to the incoming ringer hot wire of said circuitry and to said hot wire in series with said impedance means, said impedance means having an impedance value sufficient to reduce the current flow and thus the magnetomotive force through said ringer circuit below that necessary to ring said bell while allowing current to flow through said coil means.

4. The apparatus of claim 3 wherein said impedance means includes a resistor and a neon lamp in parallel with each other and in series with said ringer circuit so that said lamp is illuminated when said standard voltage is imposed thereon.

5. The apparatus of claim 3 further including second means for selectively increasing the ringing voltage imposed across said first means and said ringer circuit to increase the current in the ringer circuit of said telephone above that necessary to ring said bell.

6. The apparatus of claim 5 wherein said telephone circuitry includes a ringing signal generator and wherein said second means includes second switch means and transformer means, said second switch means alternatively connecting said generator directly to said first means and said ringer circuit, and to said first means and said ringer circuit through said transformer means, said transformer means increasing the standard voltage output from said generator to a value sufficient to increase the current in said ringer circuit above that necessary to ring said bell.

7. The apparatus of claim 1 wherein said coil means includes a plurality of electromagnetic coils in said ringer circuit associated with said bell for causing same to ring when the standard ringing voltage is imposed across said ringer circuit and wherein said first means includes a switch selectively connecting said plurality of coils to said hot wire so that the current flow through at lease one of said coils is reversed from that normally associated with said at least one of said coils and the current flow in the other of said coils is not reversed.

8. The apparatus of claim 7 wherein said switch includes first and second contacts connected to one side of said one of said coils; third and fourth contacts connected to the other side of said one of said coils; a first switch arm connected to the incoming ringer hot wire and adapted to alternately close said first and said third contacts; and a second switch arm ganged to said first switch arm and connected to the input side of said other of said coils, said second switch arm constructed and arranged to close said fourth contact when said first arm closes said first contact and to close said second contact when said first switch arm closes said third contact so that the current flow through both of said coils is in the direction to sum the magnetomotive forces produced therein to ring said bell when said first and fourth contacts are closed and the current flow through said coils is in the direction to subtract the magnetomotive forces produced therein to silence said bell when said third and second contacts are closed.

9. A method of selectively silencing the bell in a telephone having a ringer circuit including electromagnetic coil means and capacitive means in series and connected to the incoming ringer hot wire of a central telephone system comprising the step of selectively reducing the resultant magnetomotive forces produced by said coil means to a value below that necessary to ring said bell while permitting current to flow through said coil means when a standard ringing voltage is imposed on said incoming ringer hot wire.

10. A method as set forth in claim 9 further including the steps of selectively reducing the magnetomotive forces of said ringing circuit by increasing the impedance thereof and selectively increasing the ringing voltage in said telephone circuitry when said impedance of said ringer circuit is increased to increase the current flow through said ringer circuit sufficiently to ring said bell.

* * * * *